United States Patent
Norimatsu

(10) Patent No.: US 7,047,034 B2
(45) Date of Patent: May 16, 2006

(54) PORTABLE TELEPHONE TERMINAL AND METHOD OF CUSTOMIZING THE SAME

(75) Inventor: Hidehiko Norimatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 440 days.

(21) Appl. No.: 10/194,738

(22) Filed: Jul. 12, 2002

(65) Prior Publication Data
US 2003/0013437 A1    Jan. 16, 2003

(30) Foreign Application Priority Data
Jul. 12, 2001    (JP) ............... 2001-212510

(51) Int. Cl.
*H04M 1/00*    (2006.01)
(52) U.S. Cl. ............... 455/552.1; 455/435.1; 455/432.1
(58) Field of Classification Search .......... 455/432.1, 455/435.2, 552.1, 403, 404.2, 418, 419, 420, 455/421, 422.1, 435
See application file for complete search history.

(56) References Cited

U.S. PATENT DOCUMENTS

| | | | | |
|---|---|---|---|---|
| 5,095,531 A | * | 3/1992 | Ito | 455/435.3 |
| 5,519,758 A | * | 5/1996 | Tabbane | 455/405 |
| 5,557,654 A | * | 9/1996 | Maenpaa | 455/411 |
| 5,628,051 A | * | 5/1997 | Salin | 455/433 |
| 5,905,950 A | * | 5/1999 | Anell | 455/421 |
| 6,405,036 B1 | * | 6/2002 | Almgren et al. | 455/425 |
| 6,516,190 B1 | * | 2/2003 | Linkola | 455/408 |
| 6,577,857 B1 | * | 6/2003 | Rodriguez | 455/405 |
| 6,868,270 B1 | * | 3/2005 | Dent | 455/435.1 |
| 2001/0009853 A1 | | 7/2001 | Arimitsu | |
| 2002/0016169 A1 | | 2/2002 | Sykes et al. | |

FOREIGN PATENT DOCUMENTS

| | | |
|---|---|---|
| EP | 1 059 822 A2 | 12/2000 |
| GB | 2 292 047 A | 2/1996 |
| WO | WO 89/00370 A1 | 1/1989 |
| WO | WO 00/79827 A1 | 12/2000 |

* cited by examiner

*Primary Examiner*—CongVan Tran
(74) *Attorney, Agent, or Firm*—Scully, Scott, Murphy & Presser, P.C.

(57) ABSTRACT

In a portable telephone terminal for use in network services provided by a plurality of communication service operators through networks, respectively, the portable telephone terminal is connected with one of the networks by registering a position of the portable telephone terminal and transmits and receives a voice signal or a data signal by a control section, the control section has functions corresponding to the network services between the networks and the portable telephone terminal required by a plurality of communication service operators, the control section recognizes a recognition number of the one of networks to be connected with the portable telephone terminal, and based on the recognition number, the control section makes each of the functions be effective or ineffective corresponding to the one of networks to be connected.

6 Claims, 4 Drawing Sheets

PORTABLE TELEPHONE TERMINAL AND METHOD OF CUSTOMIZING THE SAME

BACKGROUND OF THE INVENTION

The present invention relates to a portable telephone terminal and a method of customizing the portable telephone terminal, in particular to a portable telephone terminal capable of customizing functions for services of terminals and networks required by a plurality of communication service operators.

Conventionally, a plurality of portable telephone services have been provided by various communication service operators. Recently, each communication service operator has become to provide an original service in order that the original service may be distinguished from portable telephone services provided by the other communication service operators.

Under the circumstances, in manufacturing portable telephone terminals, specifications of portable telephone terminals are determined to have functions required for the original services per each communication service operator, respectively. Accordingly, such portable telephone terminals are adjusted to be sold as special purpose portable telephone terminals, respectively, for portable telephone services provided by each of the communication service operators.

However, it is necessary for a manufacturer of the portable telephone terminals to produce, per each communication service operator, products of the portable telephone terminals having functions required for the services of terminals and networks required by each of the communication service operators. As a result, kinds of the products of the portable telephone terminals are inevitably increased. Further, a cost required for development and production of the portable telephone terminals becomes high.

Furthermore, even if wireless access systems for the portable telephone services provided by each of the communication service operators are, for example, the same as each other, one communication service operator sometimes provide a service in accordance with a standard A while another communication service operator sometimes provide a service in accordance with a standard B. Thus, the services of terminals and networks provided by each of the communication service operators are themselves different from each other.

In order to solve this problem, it is necessary to develop an application software having functions capable of corresponding to both the services A and B. It is then necessary to apply the application software to a portable telephone terminal so that the portable telephone terminal may comply with both of the one and the another communication service operators. Nevertheless, it is impossible to judge how to change and drive the function to correspond to either the service A or the service B. It is therefore difficult to actually enjoy either the service A and the service B.

Moreover, requirements for operability of the portable telephone terminals sometimes differ from each other per each communication service operator. Consequently, it is necessary to develop portable telephone terminals also regarding the operability thereof per each communication service operator. This causes problems similar to those mentioned above. Namely, kinds of the products of the portable telephone terminals are inevitably increased. In addition, a cost required for development and production of the portable telephone terminals becomes high.

SUMMARY OF THE INVENTION

It is therefore an object of the present invention to provide a portable telephone terminal which is capable of being customized corresponding to services of terminals and networks required by a plurality of communication service operators and a method of customizing the portable telephone terminal.

Other objects of the present invention will become clear as the description proceeds.

According to an aspect of the present invention, there is provided a portable telephone terminal for use in network services provided by a plurality of communication service operators through networks, respectively, comprising:

position registering means for registering a position of the portable telephone terminal to connect the portable telephone terminal with one of the networks;

a control section for transmitting and receiving a voice signal or a data signal, the control section having functions corresponding to the network services between the networks and the portable telephone terminal required by the a plurality of communication service operators;

the control section recognizing a recognition number of the one of networks to be connected with the portable telephone terminal; and based on the recognition number, the control section making each of the functions be effective or ineffective corresponding to the one of networks to be connected.

With the structure of the portable telephone terminal, in a case that the portable telephone terminal is used in a portable telephone service provided by a certain communication service operator, the control section recognizes a recognition number of one of the networks to be connected with the portable telephone terminal and, based on the recognition number, then makes each of the functions be effective or ineffective corresponding to the portable telephone service. The control section can thereby make only a function required for the portable telephone service be effective. As a result, the portable telephone terminal can be customized to be such a portable telephone terminal that has a function corresponding to the network service between the network and the portable telephone terminal required by the communication service operator.

At the time, the portable telephone terminal has functions corresponding to the network services between the networks and the portable telephone terminal required by the a plurality of communication service operators in the control section. Consequently, a portable telephone terminal for portable telephone services by a plurality of communication service operators can be provided only by preparing a single kind of the portable telephone terminal.

Accordingly, kinds of portable telephone terminals for use in portable telephone services by a plurality of communication service operators can be decreased. Therefore, a cost for developing and manufacturing the portable telephone terminal can be reduced.

In the portable telephone terminal, when a power supply of the portable telephone terminal is ON, at first, the position registering means may register the position of the portable telephone terminal to connect the portable telephone terminal with one of the networks, wherein the control means thereafter may recognize the recognition number of the one of the networks.

With the structure of the portable telephone terminal, when a power supply of the portable telephone terminal is ON, by the portable telephone terminal automatically conducting a position registration and a recognition of a recognition number of the network by itself, an user can use a portable telephone service provided by a communication service operator with which the user is contracting.

In the portable telephone terminal, when a power supply of the portable telephone terminal is ON, at first, the control means may recognize the recognition number of one of the networks, wherein the position registering means thereafter may registers the position of the portable telephone terminal to connect the portable telephone terminal with the one of the networks.

With the structure of the portable telephone terminal, when a power supply of the portable telephone terminal is ON, by the portable telephone terminal automatically conducting a position registration and a recognition of a recognition number of the network by itself, an user can use a portable telephone service provided by a communication service operator with which the user is contracting. Further, since the position of the portable telephone terminal is registered after the recognition number of one of the networks has been recognized, an original function corresponding to an original terminal service required by a communication service operator can be made effective in a sequence required for the position registration. The user then can use the original function.

In the portable telephone terminal, when a network is changed in the portable telephone terminal, the control means may recognize a recognition number of a new one of networks, based on the recognition number, the control means may make each of the functions be effective or ineffective corresponding to the new one of networks.

With the structure of the portable telephone terminal, in a case that an user wishes to change a network of a portable telephone service provided by a communication service operator, the control section recognizes a recognition number of a new network and then makes only a function required for the portable telephone service be effective. As a result, the portable telephone terminal can be customized to be such a portable telephone terminal that has a function corresponding to the network service between the network and the portable telephone terminal required by the communication service operator after the user has changed the network.

In the portable telephone terminal, when the control means cannot recognize a recognition number of one of networks to be connected, the control means may make each of the functions be effective or ineffective corresponding to the one of networks to be connected in accordance with an operation by an user of the portable telephone terminal.

With the structure of the portable telephone terminal, in a case that the control means cannot recognize a recognition number of one of networks to be connected, the user manually operates an input portion of the portable telephone terminal. The control section thereby makes only a function required for the network service be effective in accordance with the operation by the user. As a result, the portable telephone terminal can be customized to be such a portable telephone terminal that has a function corresponding to the network service between the network and the portable telephone terminal required by the communication service operator.

According to another aspect of the present invention, there is also provided a method of customizing a portable telephone terminal for use in network services provided by a plurality of communication service operators through networks, respectively, the method comprising the steps of: previously preparing functions corresponding to the network services between the networks and the portable telephone terminal required by the a plurality of communication service operators in a control section; and when the control section has recognized a recognition number of one of networks to be connected with the portable telephone terminal, the control section, based on the recognition number, making each of the functions be effective or ineffective corresponding to the one of networks to be connected.

With the structure of the method of customizing a portable telephone terminal, in a case that the portable telephone terminal is used in a portable telephone service provided by a certain communication service operator, the control section recognizes a recognition number of one of the networks to be connected with the portable telephone terminal and, based on the recognition number, then makes each of the functions be effective or ineffective corresponding to the portable telephone service. The control section can thereby make only a function required for the portable telephone service be effective. As a result, the portable telephone terminal can be customized to be such a portable telephone terminal that has a function corresponding to the network service between the network and the portable telephone terminal required by the communication service operator.

At the time, the portable telephone terminal has functions corresponding to the network services between the networks and the portable telephone terminal required by the a plurality of communication service operators in the control section. Consequently, a portable telephone terminal for portable telephone services by a plurality of communication service operators can be provided only by preparing a single kind of the portable telephone terminal.

Accordingly, kinds of portable telephone terminals for use in portable telephone services by a plurality of communication service operators can be decreased. Therefore, a cost for developing and manufacturing the portable telephone terminal can be reduced.

DETAILED DESCRIPTION OF THE PREFERRED EMBODIMENT

Figure 1:
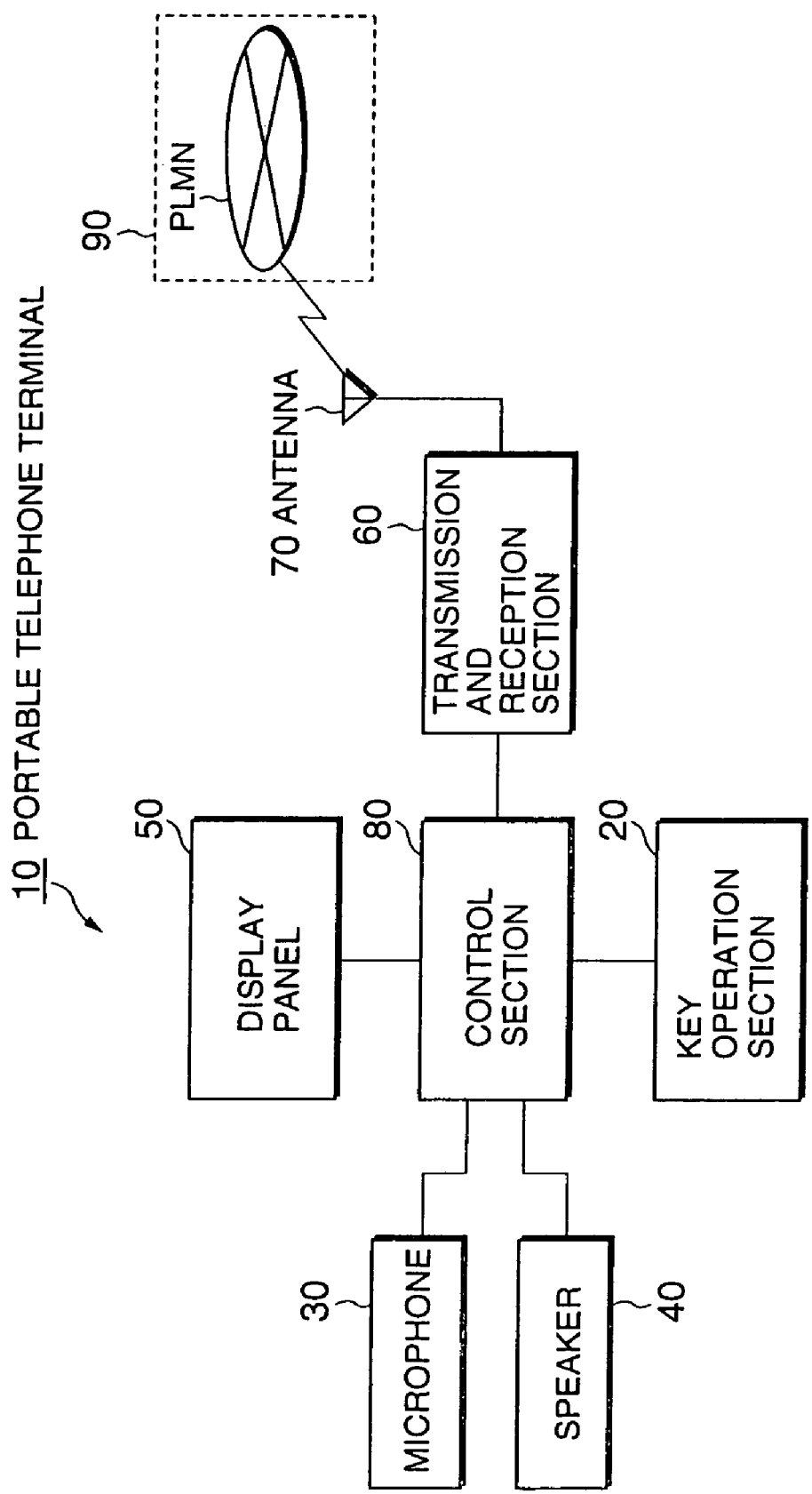
FIG. 1 is a block diagram for schematically showing a constitution of a portable telephone terminal according to a first embodiment of the present invention.

Referring to FIGS. 1 through 4, description will proceed to a portable telephone terminal and a method of customizing a portable telephone terminal according to a preferred embodiment of the present invention. FIG. 1 is a block diagram for schematically showing a constitution of a portable telephone terminal according to the preferred embodiment of the present invention.

As illustrated in FIG. 1, the portable telephone terminal 10 according to this embodiment comprises a key operation section 20, a microphone 30, a speaker 40, a display panel 50, a transmission and reception section 60, an antenna 70, and a control section 80.

In the portable telephone terminal 10, the key operation section 20 comprises a plurality of operation keys (not shown). An user of the portable telephone terminal 10 can conduct a predetermined operation by operating any one of or a plurality of the operation keys.

Further, the microphone 30 is adjusted to function as a telephone transmitter section to which a voice of an user of the portable telephone terminal 10 is input and which converts the voice into a voice signal.

On the other hand, the speaker 40 is adjusted to function as a telephone receiver section which converts a transmitted voice signal into a voice.

The display panel 50 is composed, for example, of a liquid crystal dot-matrix type display and is adjusted to conduct various displays.

The transmission and reception section 60 is connected to a network of a portable telephone service provided by a communication service operator 90, that is, for example, PLMN (Public Land Mobile Network) by way of the antenna 70. The transmission and reception section 60 conducts a talking or a data communication by transmitting and receiving a voice signal or a data signal.

Besides, only one communication service operator 90 is depicted in FIG. 1. However, a plurality of communication service operators 90 are existing actually and constructing networks for providing portable telephone services, respectively.

Similarly to a control section of the above-mentioned conventional portable telephone terminal, the control section 80 is adjusted to conduct a position registration, a transmission, a reception, a talking and a data communication by the use of the PLMN, namely, the network of the portable telephone service provided by the communication service operator 90 by driving and controlling the above-described key operation section 20, microphone 30, speaker 40, display panel 50, transmission and reception section 60.

Further, based on the present invention, the control section 80 has functions corresponding to network services between the networks and the portable telephone terminal required by a plurality of communication service operators.

These functions are, for example, HMI (Human Machine Interface), a combination of wireless parameters, or application software, such as a browser, a communication protocol, and the like.

Herein, the control section 80 is adjusted to be able to make the functions individually be effective or ineffective, respectively.

Furthermore, when the portable telephone terminal 10 is connected to the PLMN, namely, the network of the portable telephone service provided by the communication service operator 90, the control section 80 recognizes a recognition number PLMNidentity91 assigned to the network. The control section 80 then identifies the communication service operator 90 providing the portable telephone service by the recognition number PLMNidentity91. The control section 80 is adjusted to make the functions be effective or ineffective, respectively, corresponding to the communication service operator 90.

Besides, the numbers PLMNidentity91, namely, recognition numbers of networks of the portable telephone services provided by a plurality of communication service operators 90 to be connected have previously been registered in the control section 80.

Figure 2:
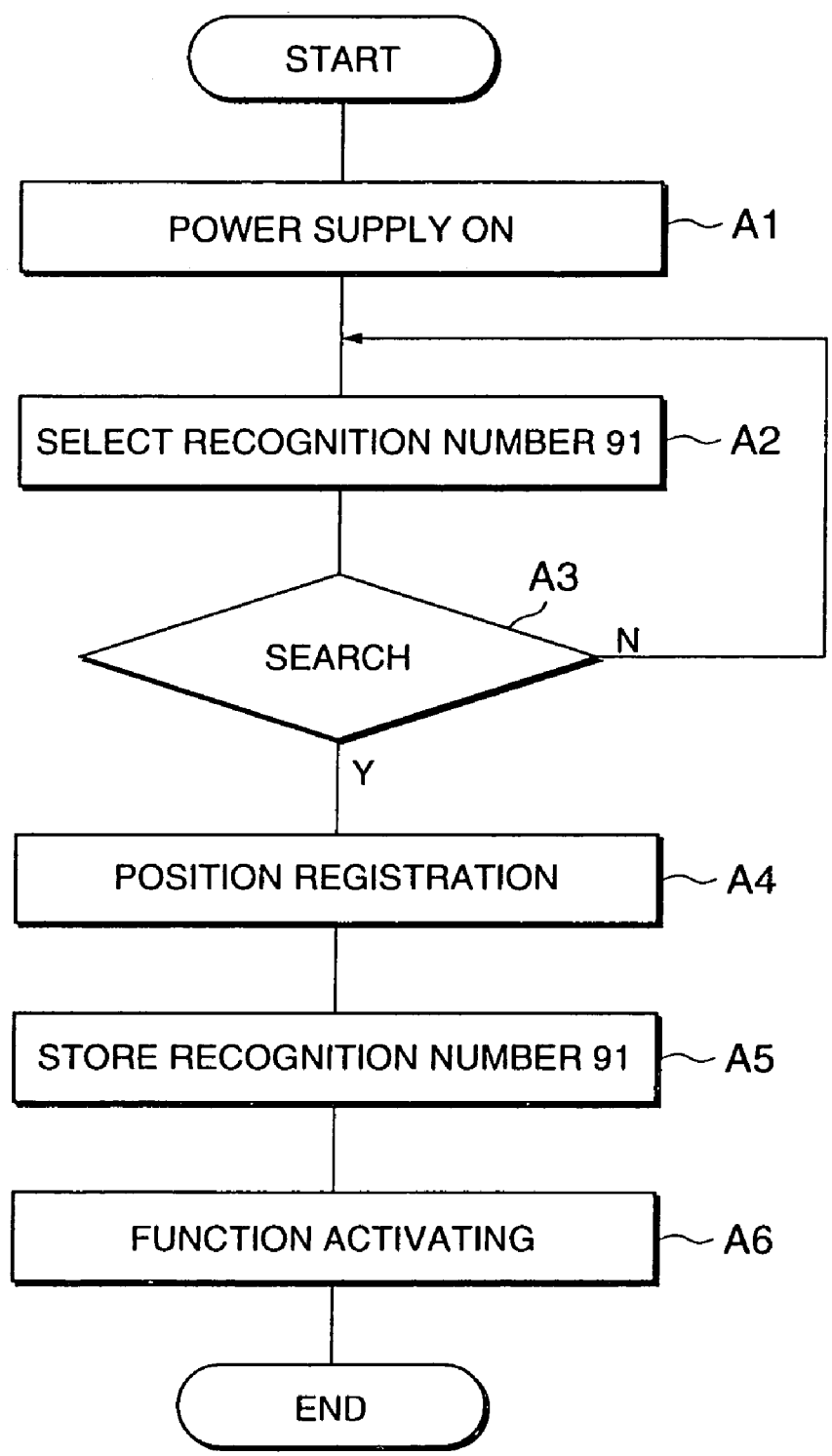
FIG. 2 is a flow chart for schematically showing an automatic function activating operation when a power supply is ON in the portable telephone terminal illustrated in FIG. 1.
Figure 3:
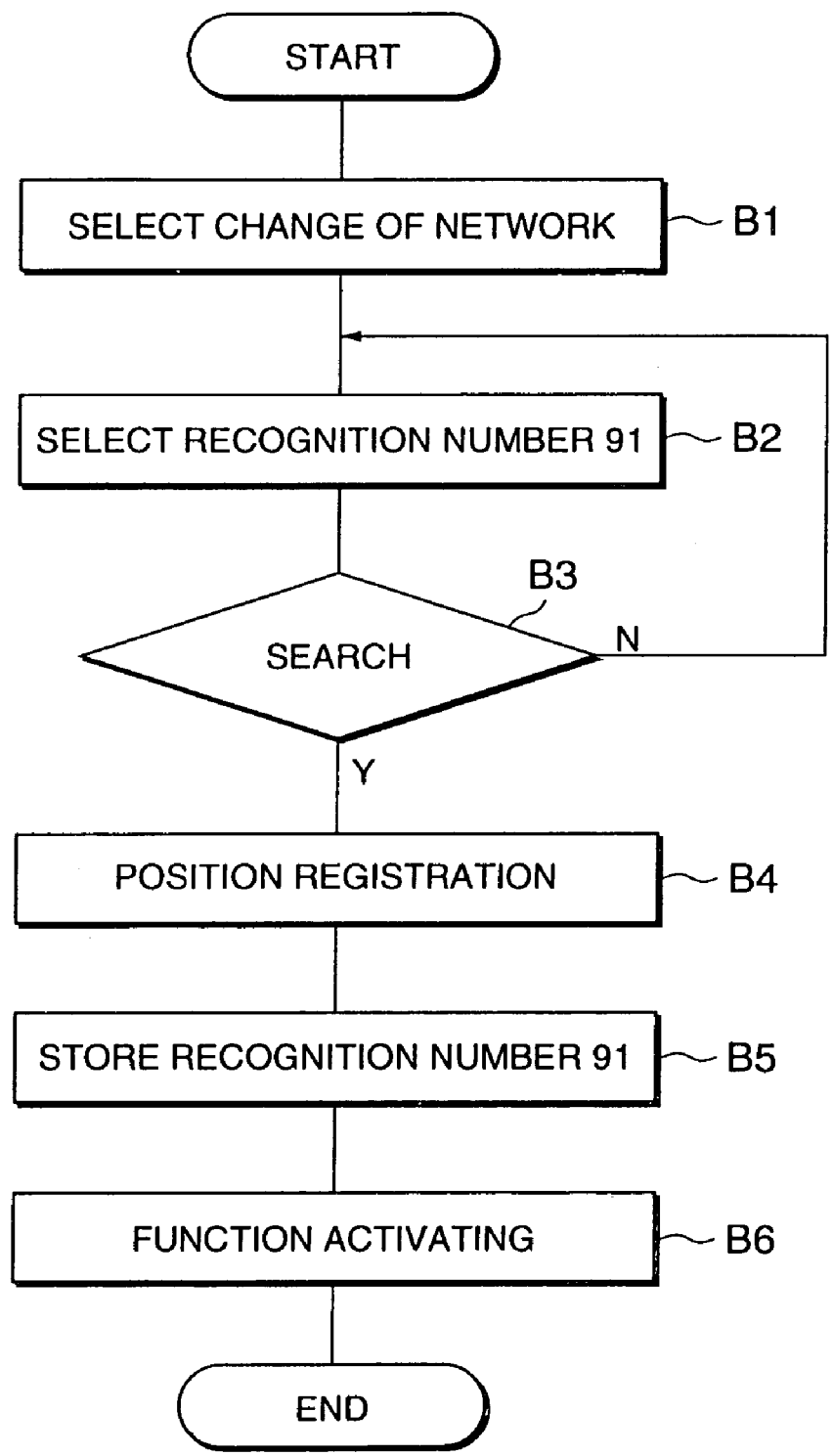
FIG. 3 is a flow chart for schematically showing an automatic function activating operation when a network is changed in the portable telephone terminal illustrated in FIG. 1.
Figure 4:
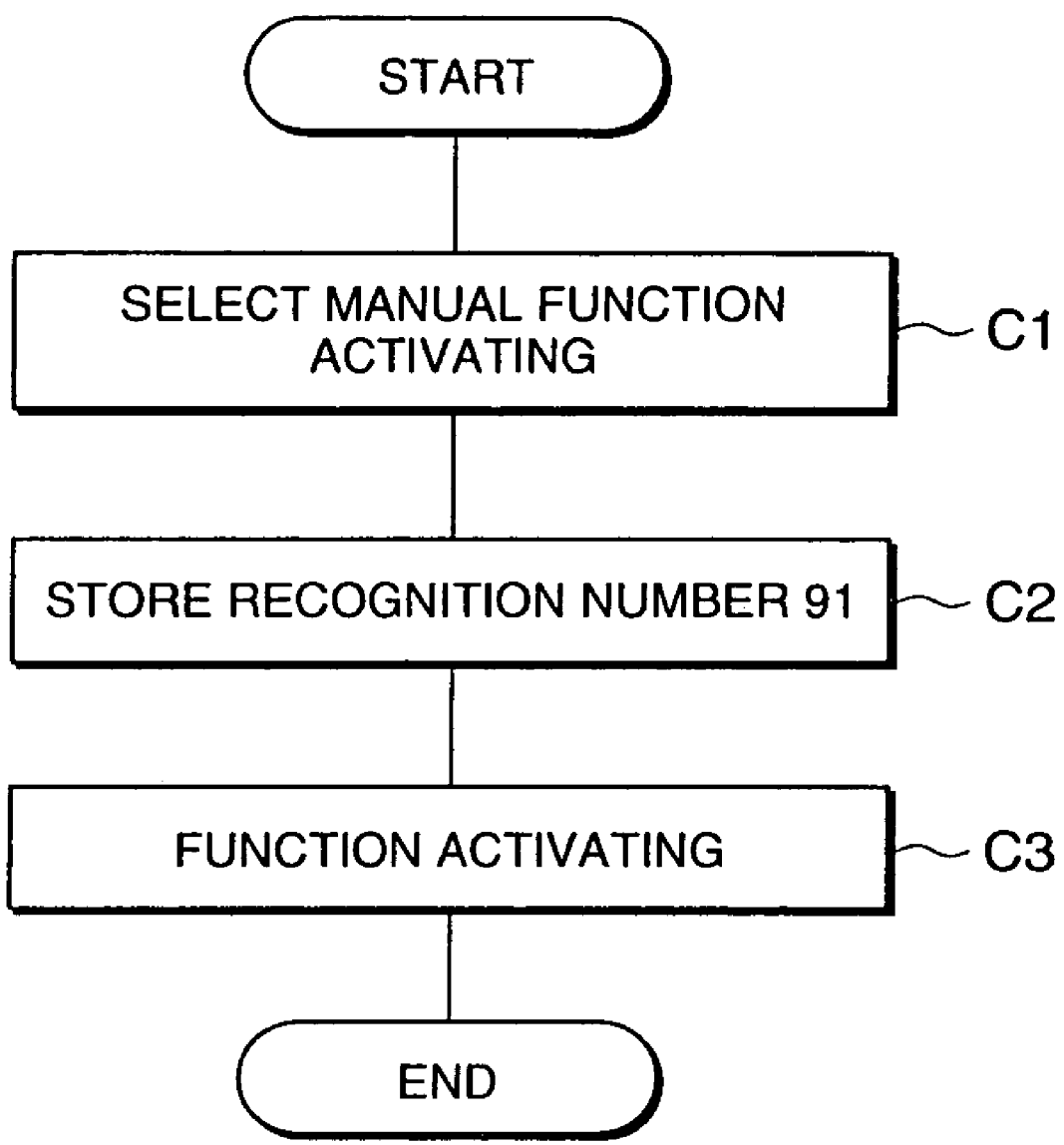
FIG. 4 is a flow chart for schematically showing a manual function activating operation in the portable telephone terminal illustrated in FIG. 1.

Next, referring to FIGS. 2 through 4, description proceeds to an operation of the portable telephone terminal 10 according to this embodiment of the present invention. FIG. 2 is a flow chart for schematically showing an automatic function activating operation when a power supply is ON in the portable telephone terminal 10. FIG. 3 is a flow chart for schematically showing an automatic function activating operation when a network is changed in the portable telephone terminal 10. FIG. 4 is a flow chart for schematically showing a manual function activating operation in the portable telephone terminal 10. The portable telephone terminal 10 is used in each step of the automatic function activating operation when a power supply is ON illustrated in FIG. 2, the automatic function activating operation when a network is changed illustrated in FIG. 3, and the manual function activating operation illustrated in FIG. 4, respectively.

At first, referring to FIG. 2 with reference to FIG. 1 continued, description is made about the automatic function activating operation, when a power supply is ON.

In FIG. 2, as depicted by a symbol A1, an user operates the key operation section 20. Thereby, the power supply of the portable telephone terminal 10 is ON. Accordingly, the control section 80 of the portable telephone terminal 10 selects one recognition number PLMNidentity91 among a plurality of registered recognition numbers PLMNidentity91 of the networks, as depicted by a symbol A2.

Thereafter, the control section 80 controls the transmission and reception section 60 to search a network of a portable telephone service corresponding to the selected recognition number PLMNidentity91 by way of the antenna 70, as depicted by a symbol A3.

Herein, when the control section 80 could not find the network of the portable telephone service corresponding to the selected recognition number PLMNidentity91, the control section 80 selects a new recognition number PLMNidentity91 and searches a network of a portable telephone service corresponding to the newly selected recognition number PLMNidentity91. The selection of a new recognition number PLMNidentity91 and the search of a network of a portable telephone service corresponding to the newly selected recognition number PLMNidentity91 will be repeated until the control section 80 can find the network of the portable telephone service corresponding to the selected recognition number PLMNidentity91.

On the contrary, when the control section 80 could find the network of the portable telephone service corresponding to the selected recognition number PLMNidentity91, the control section 80 conduct a position registration to the network, as depicted by a symbol A4. Further, the control section 80 stores the recognition number PLMNidentity91, as depicted by a symbol A5. Consequently, the control section 80 comes to recognize a portable telephone service provided by the communication service operator 90 to be connected.

Next, the control section 80 makes only a function required for terminal/network service required by the communication service operator 90 be effective based on the stored recognition number PLMNidentity91, as depicted by a symbol A6.

Thus, the automatic function activating operation is completed, when a power supply is ON.

Accordingly, by the use of the portable telephone service provided by the communication service operator 90, the portable telephone terminal 10 is capable of conducting a talking or a data communication by transmission and reception of a voice signal or a data signal. In addition, the portable telephone terminal 10 is then capable of utilizing the function required for the terminal/network service required by the communication service operator 90.

Next, referring to FIG. 3 with reference to FIG. 1 continued, description is made about the automatic function activating operation when a network is changed.

In FIG. 3, as depicted by a symbol B1, an user operates the key operation section 20. Thereby, the change of the network of the portable telephone terminal 10 is selected Accordingly, the control section 80 of the portable telephone terminal 10 selects another one recognition number PLMNidentity91 different from the one which has been selected until then among a plurality of registered recognition numbers PLMNidentity91 of the networks, as depicted by a symbol B2.

Thereafter, the control section 80 controls the transmission and reception section 60 to search a network of a portable telephone service corresponding to the new recognition number PLMNidentity91 by way of the antenna 70, as depicted by a symbol B3.

Herein, when the control section 80 could not find the network of the portable telephone service corresponding to the new recognition number PLMNidentity91, the control section 80, as depicted again by a symbol B2, selects a further new recognition number PLMNidentity91 and searches a network of a portable telephone service corresponding to the further new recognition number PLMNidentity91. The selection of a further new recognition number PLMNidentity91 and the search of a network of a portable telephone service corresponding to the further new recognition number PLMNidentity91 will be repeated until the control section 80 can find the network of the portable telephone service corresponding to the further new recognition number PLMNidentity91.

On the contrary, when the control section 80 could find the network of the portable telephone service corresponding to the (further) new recognition number PLMNidentity91, the control section 80 conduct a position registration to the network, as depicted by a symbol B4. Further, the control section 80 stores the recognition number PLMNidentity91, as depicted by a symbol B5. Consequently, the control section 80 comes to recognize a portable telephone service provided by the communication service operator 90 to be connected.

Next, the control section 80 makes only a function required for terminal/network service required by the communication service operator 90 be effective based on the stored recognition number PLMNidentity91, as depicted by a symbol B6.

Thus, the automatic function activating operation is completed, when a network is changed.

Accordingly, by the use of the portable telephone service provided by the new communication service operator 90 after the change of the network, the portable telephone terminal 10 is capable of conducting a talking or a data communication by transmission and reception of a voice signal or a data signal. In addition, the portable telephone terminal 10 is then capable of utilizing the function required for the terminal/network service required by the communication service operator 90.

Next, referring to FIG. 4 with reference to FIG. 1 continued, description is made about the manual function activating operation.

In a case that the control section 80 could not find the network of the portable telephone service provided by the communication service operator 90 to be connected in the search operations depicted by a symbol A3 in FIG. 2 and a symbol B3 in FIG. 3, an user of the portable telephone terminal 10 conduct the manual function activating operation.

In FIG. 4, as depicted by a symbol C1, an user operates the key operation section 20. Thereby, the manual function activating operation of the portable telephone terminal 10 is selected. Accordingly, based on the recognition number PLMNidentity91 of a network selected by the user, the control section 80 of the portable telephone terminal 10 stores the recognition number PLMNidentity91, as depicted by a symbol C2. Consequently, the control section 80 comes to recognize a portable telephone service provided by the communication service operator 90 to be connected.

Next, the control section 80 makes only a function required for terminal/network service required by the communication service operator 90 be effective based on the stored recognition number PLMNidentity91, as depicted by a symbol C3.

Thus, the manual function activating operation is completed.

Accordingly, by the use of the portable telephone service provided by the communication service operator 90 selected by the user, the portable telephone terminal 10 is capable of conducting a talking or a data communication by transmission and reception of a voice signal or a data signal. In addition, the portable telephone terminal 10 is then capable of utilizing the function required for the terminal/network service required by the communication service operator 90.

According to the portable telephone terminal 10 of this embodiment of the present invention, one portable telephone terminal 10 has all functions of a terminal required for terminal/network services required by a plurality of communication service operators 90 in the control section 80. The portable telephone terminal 10 can make only a function required for an original service of the communication service operator 90 be effective, dependent on a network of a portable telephone service provided by the communication service operator 90 to be connected. Thereby, the portable telephone terminal 10 can be customized to be such a portable telephone terminal for utilizing the portable telephone service provided by the communication service operator 90.

As a result, one kind of the portable telephone terminal 10 can utilize the portable telephone services provided by a plurality of communication service operators 90 by making a plurality of functions be adequately effective or ineffective, respectively, per each communication service operator 90 to be connected.

Therefore, it is not necessary for a manufacturer of the portable telephone terminals to develop and produce, per each communication service operator, special purpose portable telephone terminals, respectively. As a result, kinds of the products of the portable telephone terminals can be decreased. Further, a cost required for development and production of the portable telephone terminals can be reduced by a few kinds mass production.

Furthermore, it is not necessary for an user of the portable telephone terminal to exchange the portable telephone terminal itself, even if the user wishes to change the communication service operator 90. In other words, the user can utilize a portable telephone service provided by a new communication service operator 90 with continuously using the portable telephone terminal 10 that has been used until then.

According to the present invention, in a case that the portable telephone terminal is used in a portable telephone service provided by a certain communication service operator, the control section recognizes a recognition number of one of the networks to be connected with the portable telephone terminal and, based on the recognition number, then makes each of the functions be effective or ineffective corresponding to the portable telephone service. The control section can thereby make only a function required for the portable telephone service be effective. As a result, the portable telephone terminal can be customized to be such a portable telephone terminal that has a function corresponding to the network service between the network and the portable telephone terminal required by the communication service operator.

At the time, the portable telephone terminal has functions corresponding to the network services between the networks and the portable telephone terminal required by the a plurality of communication service operators in the control section. Consequently, a portable telephone terminal for portable telephone services by a plurality of communication service operators can be provided only by preparing a single kind of the portable telephone terminal.

Accordingly, kinds of portable telephone terminals for use in portable telephone services by a plurality of communication service operators can be decreased. Therefore, a cost for developing and manufacturing the portable telephone terminal can be reduced.

While this invention has thus far been described in conjunction with only a preferred embodiment thereof, it will now be readily possible for one skilled in the art to put this invention into effect in various other manners. For example, description was made about the case in which, for example, PLMN was used as a network of a portable telephone service provided by the communication service operator 90. However, the present invention is not restricted to PLMN. The present invention can be applied to a portable telephone service using a communications satellite, as far as a recognition number similar to the recognition number PLMNidentity91 of a network is assigned.

What is claimed is:

1. A portable telephone terminal for use to access network services provided by a plurality of communication service operators through networks, comprising:

position registering means for registering a position of the portable telephone terminal to connect the portable telephone terminal with a connecting network of said networks;

control means for transmitting and receiving a voice signal or a data signal, said control means having functions corresponding to said network services between said networks and said portable telephone terminal required by said plurality of communication service operators;

said control means recognizing a recognition number of the connecting network of said networks to be connected with said portable telephone terminal; and based on said recognition number, said control means making each of said functions effective or ineffective corresponding to a set of network services of the network services of the connecting network of said networks to be connected.

2. A portable telephone terminal as claimed in claim 1, wherein when a power supply of said portable telephone terminal is ON, at first, said position registering means registering said position of the portable telephone terminal connects the portable telephone terminal with the connecting network of said networks, said control means thereafter recognizes said recognition number of said connecting network of said networks.

3. A portable telephone terminal as claimed in claim 1, wherein when a power supply of said portable telephone terminal is ON, at first, said control means recognizes said recognition number of the connecting network of said networks, said position registering means thereafter registers said position of the portable telephone terminal to connect the portable telephone terminal with said connecting network of said networks.

4. A portable telephone terminal as claimed in claim 1, wherein when a network is changed in the portable telephone terminal, said control means recognizes a recognition number of another network of networks, based on said recognition number, said control means making each of said functions be effective or ineffective corresponding to a second set of network services of the network services of the other network of the networks.

5. A portable telephone terminal as claimed in claim 1, wherein when said control means cannot recognize a recognition number of one of networks to be connected, said control means makes each of said functions be effective or ineffective corresponding to the set of network services of the connecting network of the networks to be connected in accordance with an operation by a user of said portable telephone terminal.

6. A method of customizing a portable telephone terminal for use to access network services provided by a plurality of communication service operators through networks, said method comprising:

previously preparing in a control section of the portable telephone terminal functions corresponding to said network services between said networks and said portable telephone terminal required by said plurality of communication service operators; and when said control section recognizes a recognition number of a connecting network of said networks to be connected with said portable telephone terminal, said control section, based on said recognition number, sets each of said functions as effective or ineffective corresponding to a set of network services of said network services of said connecting network of the networks to be connected.

* * * * *